No. 642,773. Patented Feb. 6, 1900.
J. C. ANDERSON.
TIRE FOR BICYCLES.
(Application filed June 14, 1899.)
(No Model.)
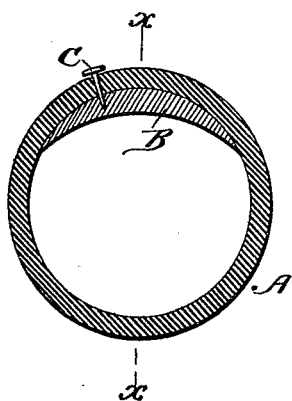
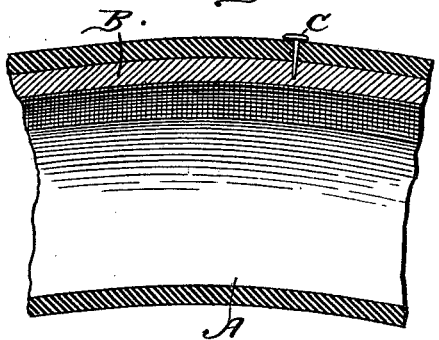
WITNESSES:
INVENTOR
James C. Anderson
BY
ATTORNEY.

UNITED STATES PATENT OFFICE.

JAMES C. ANDERSON, OF HIGHLAND PARK, ILLINOIS.

TIRE FOR BICYCLES.

SPECIFICATION forming part of Letters Patent No. 642,773, dated February 6, 1900.

Application filed June 14, 1899. Serial No. 720,515. (No model.)

*To all whom it may concern:*

Be it known that I, JAMES C. ANDERSON, a citizen of the United States, residing at Highland Park, in the county of Lake and State of Illinois, have invented certain new and useful Improvements in Tires for Bicycles or other Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in tires for bicycles and other vehicles, and particularly to that class of tires known as "pneumatic tires."

In all tires of the class referred to the chief difficulty attending their use lies in their liability to puncture, and very many suggestions have been made to overcome this defect.

My invention has for its object to prevent the escape of air if the outer or rubber portion of the tire should be punctured and to render it unnecessary to repair any such puncture, and with these ends in view my invention consists of an ordinary "hose-tire" having the inner face of the tread portion coated with asphaltum, as will be hereinafter more fully described.

In order that those skilled in the art may fully understand my invention, I will proceed to describe the construction and advantages of the same, referring by letters to the accompanying drawings, in which—

Figure 1 represents in cross-section a tire embodying my invention, and Fig. 2 a transverse section taken on the line $x$ $x$ of Fig. 1.

Similar letters of reference denote like parts in both figures.

A is an ordinary tire composed of hose-tubing, with the ends joined in the usual manner and provided with any approved air-valve. At any stage in the course of manufacture a suitable quantity of asphaltum or bitumen B is deposited within the tube in such manner that it will locate itself on the inside wall of the tread-surface of the tire in the form shown at Fig. 1. The thickness and lateral proportions of the asphalt will depend, of course, upon the quantity used; but such as is shown in the drawings (the scale of which is full size) will, it is believed, be adequate. The properties of asphalt, as is well known, are such that it will not only resist to a considerable extent penetration, but also tenaciously adhere to any penetrating-body C in such manner as to make an air-tight joint, thus preventing the escape of the confined air.

In manufacturing my improved tire, when the asphalt has been placed inside, either before or after the ends of the tube are joined, the tire is preferably placed upon a suitable form and rapidly revolved, so that by centrifugal action the location and distribution of the asphalt are properly effected.

I am aware that it is not broadly new to reinforce tires with a view to prevent puncture; but in all such instances with which I am familiar dependence is placed entirely upon the non-puncturable property of the reinforcing-body and its adaptability to move inwardly with the puncturing-body and to return to its normal position when the puncturing-body is removed. I am also aware that it has been suggested to deposit a fluid body having cementing properties, which body shall under centrifugal action or by gravity flow to that locality where punctures are liable to be made and which shall close the puncture and prevent the escape of air. The first-mentioned suggestion involves, as before stated, the permanent location of an absolutely impenetrable reinforcing-body, and the latter suggestion involves the use of a liquid or fluid body, the location of which is dependent upon and controlled by the movement of the tire.

My invention involves the permanent predetermined location of the reinforcing-body and the employment of such material that it will to a certain extent resist the force of a penetrating-body and at the same time close upon and make an air-tight joint with any such body during its penetrating movement, as clearly illustrated in the drawings, and also embody the additional and necessary properties of lightness and adaptability to the constantly-changing form of the tire when in use.

Having described the construction and advantages of my improved tire, what I claim as new, and desire to secure by Letters Patent, is—

A tire for bicycles and other vehicles composed of a tube of resilient and air-tight material, reinforced interiorly by a deposit of asphalt attached to the surface of the resilient material, substantially as and for the purpose set forth.

In testimony whereof I affix my signature in presence of two witnesses.

JAMES C. ANDERSON.

Witnesses:
N. CURTIS LAMMOND,
JNO. J. HARROWER.